United States Patent

Sly et al.

[15] 3,643,164

[45] Feb. 15, 1972

[54] SIGNAL SELECTION APPARATUS

[72] Inventors: Thomas L. Sly, Clay, N.Y.; Joseph A. Weis; Joseph T. Leto, both of Ringwood, N.J.

[73] Assignee: Anaren Microwave, Incorporated, Syracuse, N.Y.

[22] Filed: Nov. 24, 1969

[21] Appl. No.: 879,344

[52] U.S. Cl. ..............................325/308, 325/459, 325/461, 325/462, 325/465

[51] Int. Cl. ..............................H04b 1/06

[58] Field of Search ..............................325/308, 461, 462, 465, 459

[56] References Cited

UNITED STATES PATENTS

| | | | |
|---|---|---|---|
| 2,854,506 | 9/1958 | Pickles | 325/308 X |
| 3,458,819 | 7/1969 | Cafarella | 325/461 X |

*Primary Examiner*—Robert L. Griffin

*Assistant Examiner*—Kenneth W. Weinstein

*Attorney*—Camil P. Spiecens

[57] ABSTRACT

A television transmission system includes a source of television signals. The television signals are within a given spectrum of frequencies. The spectrum can be divided into a first group of channels wherein each channel has a different range of frequencies or into a second group of channels such as the conventional VHF (very high frequency) channels wherein each channel has a range of frequencies different from the ranges of the first group. The source alternately transmits television signals in the first and second groups of channels.

At least one commercial home television receiver is connected via a cable of the source. A frequency converter connects the VHF tuner of the receiver to the cable. The converter includes switching means for transmitting the signals on the cable directly to the tuner when the conventional VHF channels are transmitted so that the tuner can select the channel of the second group in the usual manner, and means for transmitting the signals via a multiposition frequency translator or converter which converts incoming signals to signals having the frequency range of a particular one of the conventional VHF channels so that the converter can select a particular one of the channels of the first group for reception by the television receiver.

4 Claims, 1 Drawing Figure

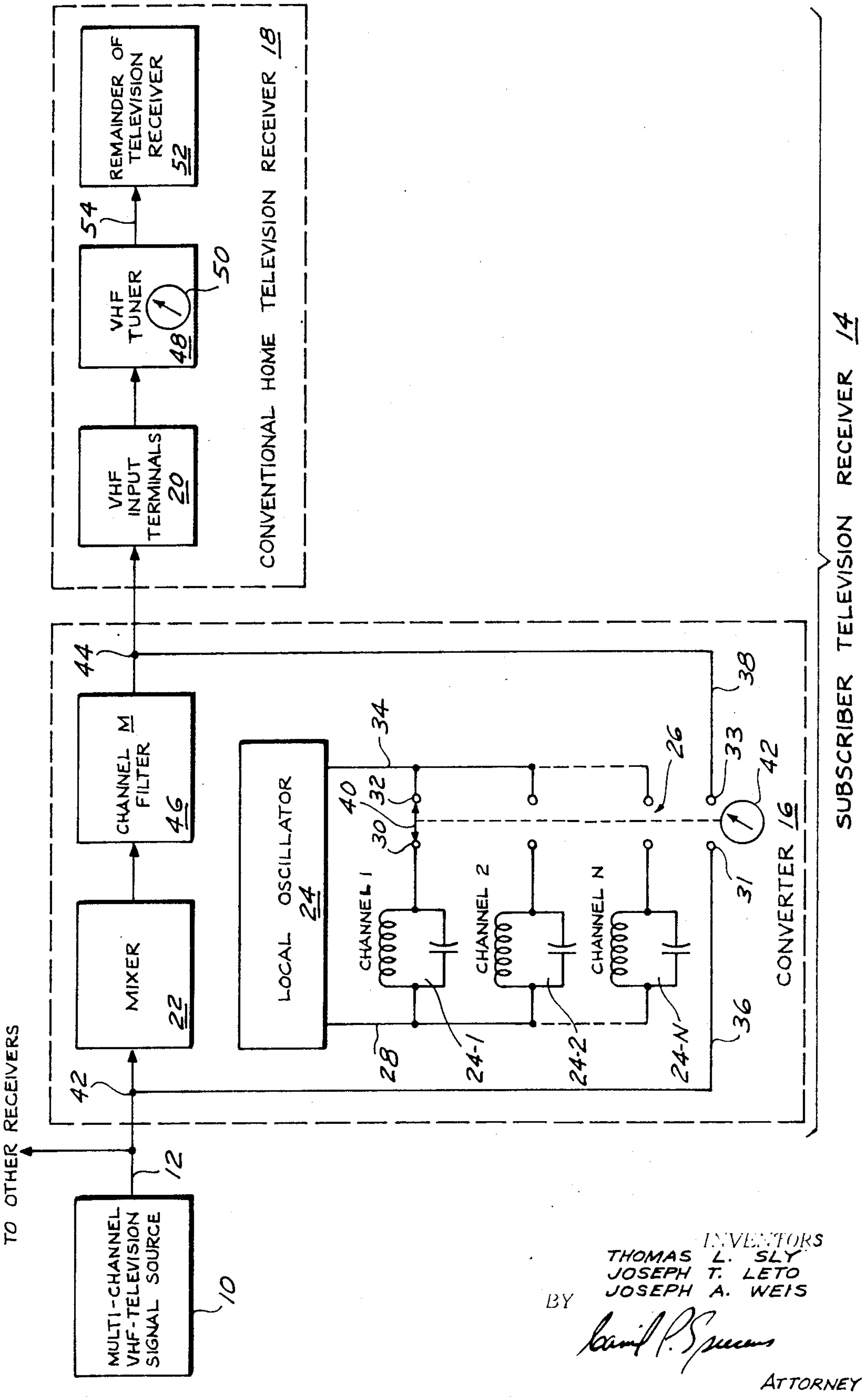
INVENTORS
THOMAS L. SLY
JOSEPH T. LETO
JOSEPH A. WEIS
BY [signature]
ATTORNEY

SIGNAL SELECTION APPARATUS

This invention pertains to signal frequency conversion and more particularly to apparatus for converting television signals in different frequency ranges.

Conventional over-the-air public television is divided into two bands of frequencies. The VHF band encompassing channels 2 to 13 and the UHF (ultra high frequency) band. In the VHF band which encompasses the 54 to 88 MHz. and 174 to 216 MHz. ranges, each channel is assigned a bandwidth of 6 megacycles, with generally, each channel abutting at least one adjacent channel.

Because of the possibility of signals from one channel "-spilling" over into the adjacent channel, adjacent channels are not assigned to different transmitters in the same geographic area. Therefore, while a conventional television receiver can receive all twelve VHF channels it does as a practical matter receive only about half that many from over-the-air transmission since there will only be that many stations transmitting in its area. Since television receiver manufacturers are aware of this situation they design the selection circuits with minimum selectivity for the sake of economy, i.e., since there is no practical need to select adjacent channels, the frequency response characteristics of the tuned elements need not be very sharp and broader tolerance components can be used.

Now, however, consider a CATV (cable television) network. Here, there is a central source of all television signals which are fed over a cable to the individual subscribers. The cable used can transmit all signals within the VHF spectrum, i.e., from 54 to 216 MHz. Therefore, as a minimum the CATV system can transmit on all 12 VHF channels. However, because the passband of the cable far exceeds the 72 megacycles (6 megacycles/channel times 12 channels) the CATV system can transmit on many more channels within the passband. While the CATV system has the capability of maximally utilizing the increased passband it is still confronted with the problem of adjacent channel "spillover," i.e., generally, the audio of one channel interferes with the video of the adjacent channel. This problem is further complicated during color transmission. Now, there have been attempts to tightly limit the frequency extremes of each channel of a CATV transmitter by the use of traps in order to prevent this "spillover." Such attempts have not sufficiently improved reception because of the loose frequency response of the selection circuits in the receivers as heretofore indicated. Therefore, the problem still exists.

One solution of the problem within a CATV system is to reassign the frequency range of each channel so that there is an adequate separation between adjacent channels. This is simply accomplished at the transmitter by changing the carrier frequency of each channel to a value such that it is separated from its adjacent channel by 8 megacycles, for example. It should be noted that this presents no problems of band width allotment since the range of 108 to 174 MHz. now used for aviation, land and marine communication in over-the-air broadcasting can be used for television channel allocation with a closed-circuit CATV system. Then, presumably, all that needs to be done is supply each home receiver with a local frequency converter to translate each of the newly assigned frequency bands back to one of the original VHF channels. Such an approach is possible when a new CATV system is being established, since each subscriber starting with the first subscriber is supplied with the converter. However, this cannot be done with already established systems which have hundreds and thousands of subscribers. These established systems now transmit signals having frequencies identical with the VHF channels. If there is an immediate changeover to the new frequency bands, the present subscribers cannot receive the new bands until they are supplied with a converter. On the other hand, if the old channels are used and the subscribers are supplied with converters they cannot receive the old channels because the converters can only select the new frequency bands. The solution appears to be to supply each subscriber with a converter and keep the changeover period as short as possible, preferably overnight. However, with thousands of subscribers in the system, an unreasonable number of technicians would be required to affect an overnight changeover since a minimum of, say, 15 minutes is required to install each converter. Therefore, if such techniques are to be employed it is necessary to provide a converter which can be installed before frequency changeover but is operative after frequency changeover.

It is an important object of the invention to provide such a converter to operate in conjunction with the conventional VHF tuner of a home broadcast television receiver.

Briefly, the invention contemplates a multichannel heterodyning apparatus for converting signals having frequencies in a spectrum of frequencies to signals having given intermediate range of frequencies. The spectrum is alternatively divided into a first plurality of channels with each of the channels having a different range of frequencies and into a second plurality of channels with each of these channels having a different range of frequencies which is different from the ranges of frequencies of the first plurality of channels. The apparatus comprises a frequency converting means connected to a tuner means. The frequency converter means includes a first multiposition channel selection means which when in a first position transmits received signals to the tuner means unchanged in frequency. When this channel selection means is in any other position it selects signals having frequencies in a particular channel from the first plurality of channels and converts the selected signals to signals having frequencies in the same given channel of the second plurality of channels and transfers the converted signals to the tuner means. The tuner means also includes a multiposition channel selection means which when in each position selects signals having frequencies in a different channel of the second plurality and converts the selected signals to the given intermediate frequency range. One of the positions selects the given channel of the second plurality to which the converter converts the signals selected thereby.

Thus, when the apparatus is receiving the first plurality of channels, a particular channel of that plurality can be selected by positioning the channel selection means of the frequency converter means to the position associated with that channel and positioning the channel selection means of the tuner to the given channel of the second plurality. When the apparatus is receiving the second plurality of channels, a particular channel of that plurality can be selected by positioning the channel selection means of the frequency converter means to the position wherein signals are fed through unconverted and positioning the channel selection means of the tuner means to the position associated with the channel of the second plurality which is to be selected.

Thus, if the second plurality of channels is the conventional VHF channels and the first plurality the translated channels it is possible to install the converter means at any time before changeover and allow the subscriber to select the VHF channels merely by positioning the converter means to the feed through position. After changeover the subscriber need only position the channel selection means of the tuner means to one given position and perform channel selection by the channel selection means of the converter means.

Other objects, the features and advantages of the invention will be apparent from the following detailed description when read with the accompanying drawing whose sole FIGURE shows in block diagram form a CATV system utilizing the invention.

The CATV system comprises a multichannel VHF-television signal source 10 connected via cable 12 to a plurality of subscriber television receivers. A typical subscriber television receiver 14 comprises a converter 16 and a conventional home television receiver 18.

Signal source 10 can be a conventional CATV transmitter which transmits television signals over a plurality of channels. The sources of the television signals can be over-the-air reception for network television stations, videotapes or locally generated program material. The channels or frequency ranges over which the source 10 transmits is determined by the carrier frequencies generated by the local oscillators of the source. Generally, the carrier frequencies are easily changeable by changing the tuning crystals of the local oscillators.

At each receiver, a converter 16 connects the cable 12 to the VHF input terminals 20 of the conventional home television receiver 18. The converter 16 comprises a mixer 22 which can be a conventional diode mixer that receives the television signals at one input and the heterodyning signals from local oscillator 24 at another input. Local oscillator 24 can be a conventional transistor-type oscillator employing tuned inductor-capacitor tuning elements. Connected, via a multiposition switch 26, to the local oscillator 24 are a plurality of tuned elements 24–1 to 24–N. Each of these elements is a parallel circuit of an inductor and a capacitor. Each parallel circuit has a different resonant frequency. One end of each parallel circuit such as the circuit for element 24–1 is connected via a common bus 28 to an appropriate point in the oscillator 24. The other end is connected to an input contact of switch 26. Associated with each input contact 30 is an output contact 32. All such output contacts are connected via a common bus 34 to another appropriate point in the oscillator 24. Switch 26 is a multiposition switch having in the present context n+1 positions. Each of the first *n* positions will operatively connect one of the tuned elements to the oscillator 24. The *n*+1 position will connect the input terminal 42 of converter 16, via leads 36 and 38 to the output terminal 44 of converter 16. These connections are accomplished by bridging wiper 40 which is moved by rotation of calibrated knob 42 of switch 26.

Returning now to the tuned elements 24–1 to 24–N, each tuned element has a resonant frequency such that when the television signal of a particular channel is to be selected by a particular position of switch 26 associated therewith the heterodyned output of mixer 22 will have a sideband having frequencies with the frequency range of one of the conventional VHF channels. For the sake of generality, it will be called channel M. In other words, for each of the first *n* positions of switch 26, the output of mixer 22 will have a sideband having frequencies equal to the frequencies of channel M. In order to filter out other sidebands the output of mixer 22 is connected via a band-pass filter 46 to output terminal 44.

Since television receiver 18 is a conventional unmodified commercially available home receiver it need not be described except to say that it is shown, merely for the sake of improving the teaching of the disclosure, divided into three parts, i.e., the VHF-input terminals 20, the VHF tuner 48, with channel selector knob 50, and the remainder of the television receiver 52. It should be noted that converter 16 will normally be in a housing placed on the top of receiver 18 with the input terminal 42 connected to the feed-in of cable 12 and the output terminal 44 connected via a standard television transmission line to the VHF input termals 20 of receiver 18.

The overall operation of the CATV system will now be described both before and after channel allocation changeover. Before changeover, signal source 10 transmits the normal VHF televisional channels, i.e., each channel has the frequency range assigned to it by the FCC. For example, channel 7 will be in the range of 174 to 180 MHz. All subscribers who are awaiting installation of their converters select channels in the normal manner by use of the channel selector connected to the VHF-tuner. Those subscribers who have a converter installed can also select these channels, In particular, such a subscriber need only position the channel selection knob 42 of switch 26 in converter 16 to the *n*+1 position. Then the received television signals enter input terminal 42, are fed via lead 36, across terminals 31 and 33 of switch 26 (bridging wiper 40 is now "jumping" these contacts), and via lead 38 and output terminal 44 to the VHF-input terminals 20 of receiver 18. In other words, the television signals are fed through converter 16, unchanged in frequency. Thereafter, the subscriber selects the channels, in the usual manner by merely using the channel selector knob 50 of receiver 18.

When all subscribers in the system have had converters installed on their receivers changeover can occur. Each subscriber is informed that after a particular time, channel selection is to be performed by positioning channel selector knob 50 of receiver 18 to a particular channel, say channel *m* (*m* equals one definite integer from 2 to 13) and leaving it in that position, and actually selecting channels by moving channel selector knob 42 of the switch 26 of converter 16.

At the particular time, the tuning crystals in the local oscillators of signal source 10 are changed to generate a new set of carrier frequencies which are sufficiently separated to prevent "spillover," for example, by 8 MHz. Thus, for example, conventional channel 7 may be transformed to a range of frequencies between 108 to 116 MHz., instead of the range 174 to 180 MHz. assigned by the FCC. In order for the subscriber to select channel 7, he positions the knob 42 of converter 16 to the position indicating channel 7. The related tuning element 24–7 is connected to local oscillator 24 which feeds a signal of 169 MHz. to mixer 22, assuming channel M is conventional VHF channel 2 (54 to 60 MHz.). Mixer 22 transmits the heterodyned signals including all sidebands. However, filter 46 only passes signals in the range of channel M, i.e., for the present example, 54 to 60 MHz. These signals are fed via the VHF input terminals 20 of receiver 18 to VHF tuner 50 which is set to channel M (channel 2, for this example). The signals are processed therein in the conventional manner and the normal intermediate range of frequencies are fed via lead 54 to the remainder of the television receiver 52.

Thus, by the interaction of the converter 16 and the VHF-tuner of a conventional home television receiver it is possible to change over an operating CATV system from conventional channel transmission to transformed channel transmission without any down time for any of the old subscribers. The transformed channel transmission not only permits much finer television reception particularly with respect to color but also permits the transmission of more than the usual 12 VHF channels because the aviation, land and marine portions as well as the FM portion of the spectrum between 54 and 221 MHz. can be divided up into at least 20 channels each separated by at least 1 MHz.

What is claimed is:

1. A cable television system comprising a transmitter which transmits at one time television signals in a first plurality of frequency channels and at another time television signals in a second plurality of frequency channels different from the first plurality of frequency channels wherein the number of frequency channels in said first plurality is greater than the number in said second plurality, and at least one subscriber receiver including a frequency converter means and a home television receiver, said home television receiver comprising an input terminal for receiving television signals and a tuner means for selecting at any given time the television signals of one of the frequency channels of only the first plurality of frequency channels, said frequency converter means including an input means for receiving television signals in any frequency channel and an output means connected to the input terminal of said home television receiver, and a multiposition frequency channel selection means including first means associated with a first position of said frequency channel selection means for transmitting television signals received at said input means unchanged in frequency to said output means, and a plurality of second means each associated with a different one of the remaining positions of said frequency channel selection means, equal in number to the number of first frequency channels, each of said second means including means for converting television signals in a different one of the frequency channels of the first plurality of frequency channels to television signals in the same specific frequency channel of said second plurality of frequency channels.

2. The cable television system of claim 1 wherein said tuner means is the VHF tuner of the home television receiver.

3. The cable television system of claim 1 wherein said frequency converter means comprises signal mixer means having a first input terminal for receiving the television signals, a second input terminal for receiving heterodyning signals, and an output terminal for transmitting heterodyned signals, means for connecting the first input terminal of said signal mixer means to the input means of said frequency converter means, a local oscillator means having an output terminal connected to the second input terminal of said signal mixer means, a plurality of oscillator tuning elements, each of said tuning elements being associated with one of the frequency channels of said first plurality of frequency channels, respectively, a multiposition switching means including a first position having means for connecting the input terminal to the output terminal of said frequency converter means, and each of the remaining positions connecting one of said oscillator tuning elements to said local oscillator means, and means for connecting the output terminal of said signal mixing means to the output terminal of said frequency converting means.

4. The cable television system of claim 3 wherein said means for connecting the output terminal of said signal mixing means to the output terminal of said frequency converting means comprises means for transmitting signals only having frequencies in said same specific frequency channel of said second plurality of frequency channels.

* * * * *